March 19, 1968
H. J. HILL ET AL
3,374,023
KNEE-ACTUABLE CARPET STRETCHER WITH ADJUSTABLE-LENGTH SHANK
Filed April 4, 1966
2 Sheets-Sheet 1
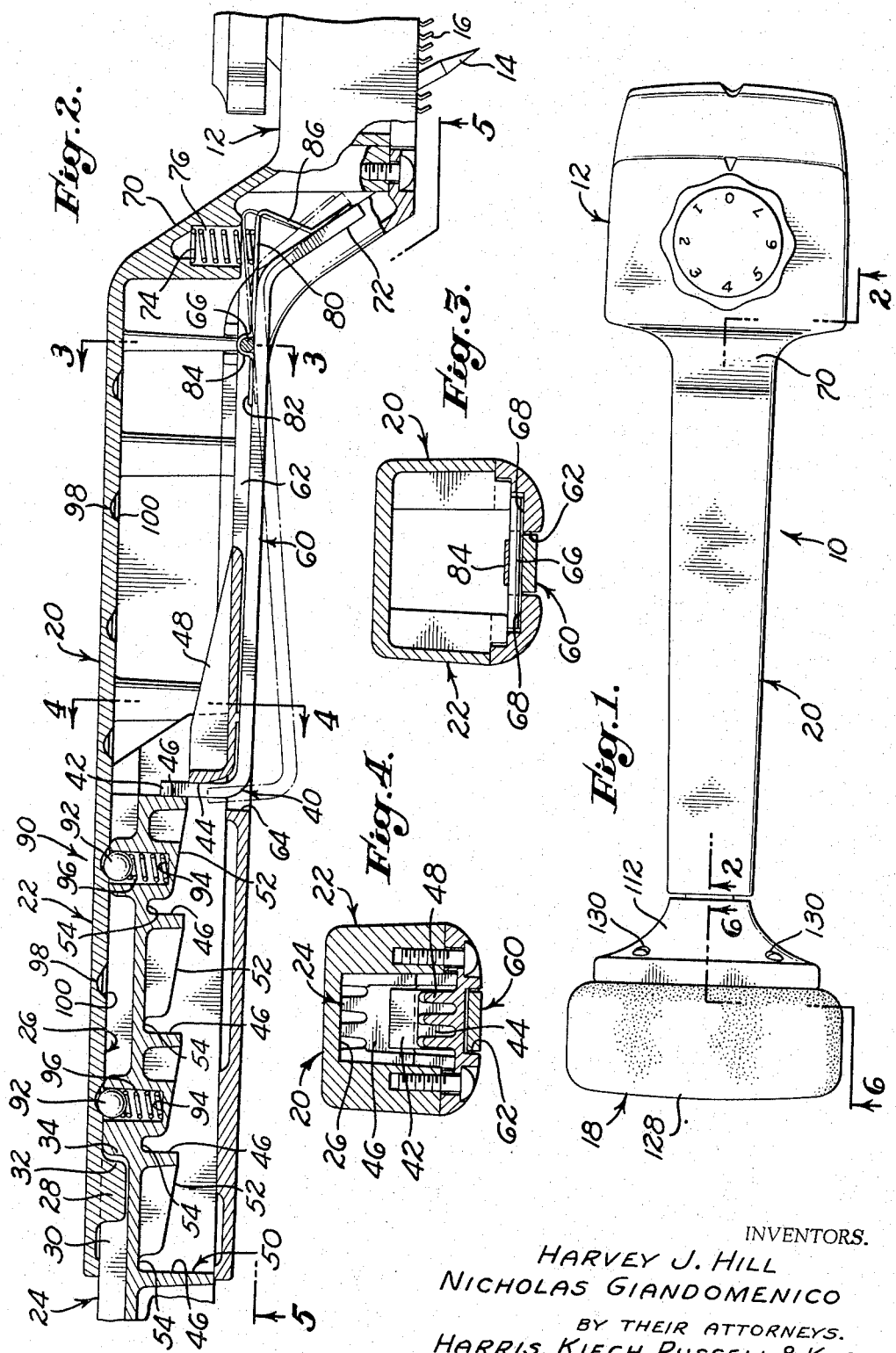
INVENTORS.
HARVEY J. HILL
NICHOLAS GIANDOMENICO
BY THEIR ATTORNEYS.
HARRIS, KIECH, RUSSELL & KERN

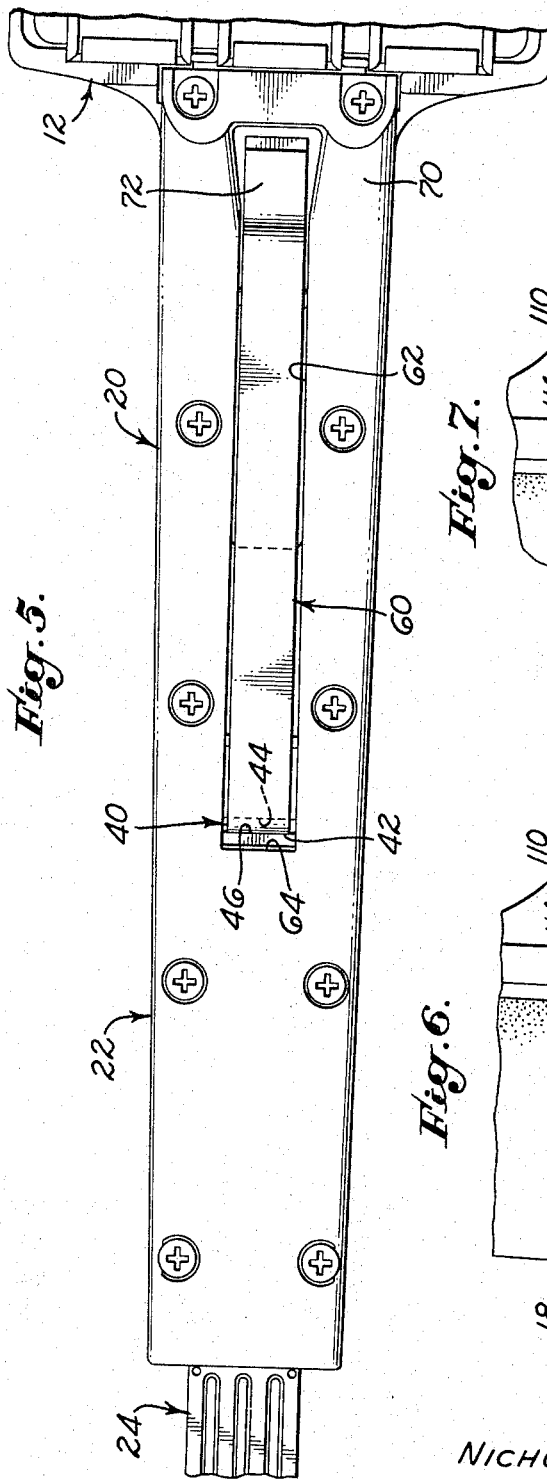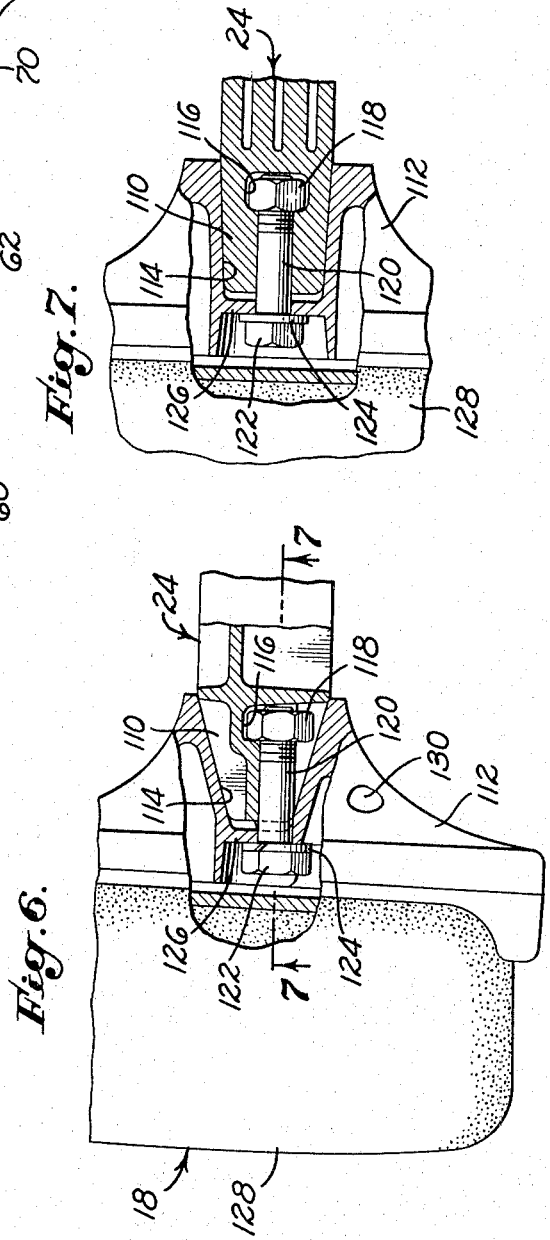

United States Patent Office 3,374,023
Patented Mar. 19, 1968

3,374,023
KNEE-ACTUABLE CARPET STRETCHER WITH ADJUSTABLE-LENGTH SHANK
Harvey J. Hill, Monterey Park, and Nicholas Giandomenico, Covina, Calif., assignors to Roberts Consolidated Industries, Inc., City of Industry, Calif., a corporation of California
Filed Apr. 4, 1966, Ser. No. 539,965
8 Claims. (Cl. 294—8.6)

ABSTRACT OF THE DISCLOSURE

An adjustable-shank knee-actuable carpet stretcher having a trigger-operated laterally-movable stop acting in shear between a laterally-extending fixed stop on one shank member and each of a series of longitudinally-spaced laterally-extending fixed stops on another shank member telescopically connected to the first. Mechanism for releasably latching the shank members in their different relative longitudinal positions for indexing purposes, and for simultaneously longitudinally biasing the shank members relative to each other in directions to maintain the movable stop in positive engagement with the two fixed stops between which it is inserted, so as to prevent rattling.

Background of the invention

The present invention relates in general to a device engageable with carpeting adjacent the edges thereof to stretch the carpeting as its edges are hooked over projections on carpet gripper strips extending along the edges of the area to be carpeted.

More particularly, the invention relates to a knee-actuable carpet stretching device of the type disclosed in Patent No. 2,882,642, granted Apr. 21, 1959, to Harvey J. Hill, a general object being to provide a carpet stretcher incorporating improvements on that of the aforementioned patent.

As background, a carpet stretcher of the type to which the invention relates includes a carpet gripping head having prongs engageable with the carpeting adjacent the edge thereof to be anchored, and includes a knee-actuable bumper for displacing the carpet gripping head outwardly relative to the carpeted area so as to stretch the carpeting as it is hooked onto the projections on the corresponding gripper strip. The carpet gripping head and the bumper are interconnected by a shank which transmits the knee-produced carpet stretching forces from the bumper to the head so as to stretch the carpeting gripped thereby. The length of this shank is adjustable to adapt the carpet stretcher to various working conditions, increased shank length being necessary, for example, when anchoring a carpet edge under an overhang, and decreased length being necessary in a closet, for example.

To provide the desired length adjustment for the shank interconnecting the knee-actuable bumper and the carpet gripping head, the shank includes two shank members longitudinally slidable relative to each other and respectively connected to the bumper and the head, and includes means for locking the two shank members in different relative longitudinal positions. Preferably, the desired longitudinally slidable relationship between the two shank members is achieved by telescopically interconnecting them.

Summary and objects of the invention

With the foregoing background, a primary object of the invention is to provide a carpet stretcher wherein the two shank members are locked in their various relative longitudinal positions by a laterally movable stop acting in shear and carried by a longitudinally extending, pivoted trigger for moving such stop laterally between its operative and inoperative positions. A related object is to provide a trigger which acts as an indicator, both visual and tactile, of the position of the laterally movable stop carried thereby.

An important object of the invention is to provide a construction wherein the movable stop acts in shear between a laterally extending, fixed stop on one of the shank members and each of a series of longitudinally spaced, laterally extending, fixed stops on the other shank member.

Another important object of the invention is to provide interengageable means on the two shank members for longitudinally biasing the shank members relative to each other in directions to maintain the movable stop in positive engagement with the two fixed stops between which it is inserted. With this construction, there is no rattling of parts during handling or use of the carpet stretcher, which is an important feature of the invention.

Still another object of the invention is to provide a carpet stretcher of the foregoing nature wherein the interengageable biasing means mentioned also acts to releasably latch the shank members in their different relative longitudinal positions for indexing purposes, thereby facilitating lateral insertion of the movable stop between the single fixed stop mentioned and each of the series of longitudinally spaced, fixed stops on the other shank member.

A further object is to provide a simple and reliable means of connecting the bumper to its shank member, comprising a tapered socket in the bumper, a complementarily tapered end on the corresponding shank member, a nut loosely disposed in a cavity in the tapered end of such shank member, and a bolt connected to the bumper and threaded into the nut and extending longitudially of the tapered socket and tapered shank-member end to seat such tapered end in the socket.

The foregoing objects, advantages, features and results of the present invention, together with various other objects, advantages, features and results which will be evident to those skilled in the carpet stretcher art in the light of this disclosure, may be achieved with the exemplary embodiment of the invention described in detail hereinafter and illustrated in the accompanying drawings.

Description of the drawings

In the drawings:

FIG. 1 is a top plan view of a knee-actuable carpet stretcher which embodies the invention;

FIG. 2 is an enlarged, fragmentary sectional view taken as indicated by the arrowed line 2—2 of FIG. 1;

FIGS. 3 and 4 are transverse sectional views respectively taken along the arrowed lines 3—3 and 4—4 of FIG. 2;

FIG. 5 is a fragmentary bottom plan view taken as indicated by the arrowed line 5—5 of FIG. 2;

FIG. 6 is an enlarged, fragmentary sectional view taken as indicated by the arrowed line 6—6 of FIG. 1; and FIG. 7 is a fragmentary sectional view taken as indicated by the arrowed line 7—7 of FIG. 6.

Detailed description of the invention

Referring initially to FIGS. 1 to 5 of the drawings, the knee-actuable carpet stretcher of the invention is designated generally by the numeral 10 and includes a carpet gripping head 12 shown as having long and short prongs 14 and 16 respectively engageable with the backing and nap of a carpet adjacent an edge thereof which is to be anchored by hooking it over upwardly and outwardly inclined projections on an adjacent carpet gripper strip, not shown. The carpet stretcher 10, which is commonly known as a "knee kicker," also includes a knee-actuable bumper 18 for displacing the carpet gripping head 12 outwardly relative to the area to be carpeted so as to stretch the carpeting as it is hooked onto the projections on the corresponding gripper strip. The carpet gripping head 12 and the bumper 18 are inter-connected by an adjustable-length shank 20 of the invention which transmits the knee produced carpet stretching forces from the bumper to the head so as to stretch the carpeting gripped thereby. As hereinbefore indicated, the purpose of making the shank 20 adjustable as to length is to accommodate various conditions encountered in laying carpeting.

The variable-length shank 20 includes telescopically-interconnected shank members 22 and 24 respectively connected to the carpet gripping head 12 and the bumper 18. The shank member 22 receives the shank member 24 therein and serves as a handle for the complete carpet stretcher 10.

The inner shank member 24 has a generally rectangular cross section and is longitudinally slidable within a complementary guide 26 in the outer shank member 22. More particularly, relative longitudinal sliding movement of the outer and inner shank members 22 and 24 is controlled by the outer walls of the inner shank member and the walls of the guide 26. Additionally, the top wall of the outer-shank member 22 is provided with a depending, longitudinal guide rib 28, FIG. 2, which is slidable in a longitudinal guide groove 30 in the inner shank member 24. It will be noted that the guide rib 28 and the guide groove 30 have interengageable ends 32 and 34 which prevent withdrawal of the inner shank member 24 from the outer shank member 22.

The invention provides means 40 for locking the shank members 22 and 24 in different relative longitudinal positions so as to adjust the length of the shank 20. As best shown in Fig. 2 of the drawings, the locking means 40 includes a laterally movable stop 42 acting in shear between a laterally extending, fixed stop 44 on the outer shank member 22 and each of a series of longitudinally spaced, laterally extending, fixed stops 46 on the inner shank member 24. In other words, the movable stop 42 has a laterally extending surface engageable with the single fixed stop 44 and has an opposite, laterally extending surface engageable with each of the fixed stops 46 to adjust the length of the shank 20. It will be noted that the knee-produced forces applied to the bumper 18 are transmitted to the carpet gripping head 12 through the movable stop 42, the latter acting in shear to transmit such forces.

Considering the various stops of the locking means 40 in more detail, the single fixed stop 44 on the outer shank member 22 projects upwardly into the interior of this shank member from the bottom wall thereof. The fixed stop 44 is braced by longitudinal ribs 48 formed integrally therewith and with the bottom wall of the outer shank member 22.

The fixed stops 46 on the inner shank member 24 are formed integrally with the top wall of the inner shank member and depend therefrom into a cavity 50 in such shank member. Each fixed stop 46 is connected to the fixed stop rearwardly thereof by an upwardly and rearwardly sloping ramp 52 leading to an upwardly extending notch 54 adjacent the next rearward fixed stop 46, the rearward direction being regarded as extending away from the carpet gripping head 12 toward the bumper 18. With this construction, when shortening the shank 20, the upper end of the movable stop 42 may slide along one of the ramps 52 into the notch 54 adjacent the next rearward fixed stop 46 in the series.

Considering the movable stop 42 in more detail, it is formed by an upturned rearward end of a longitudinally extending, pivoted trigger 60 disposed in a longitudinally extending, downwardly-facing external recess 62 in the bottom wall of the outer shank member 22. When the movable stop 42 is in its operative position between the fixed stop 44 on the outer shank member 22 and one of the fixed stops 46 on the inner shank member 24, the trigger 60 is completely contained within the recess 62 and the lower surface of the trigger is flush with the lower surface of the shank 20. This provides both a visual and a tactile indication that the movable stop 42 is in its operative position to lock the shank members 22 and 24 in one of their relative longitudinal positions.

Considering the trigger 60 in more detail, the movable stop 42 constituting the rearward end thereof projects upwardly into the interior of the outer shank member 22 through a slot 64 in the bottom wall of the outer shank member. The trigger 60 is pivotally mounted on the outer shank member 22, intermediate the forward and rearward ends of the trigger, by a laterally extending, horizontal pivot pin 66. The latter extends transversely of the trigger 60 and is secured to the trigger intermediate its ends. The upper side of the bottom wall of the outer shank member 22 is provided with axially aligned recesses 68 receiving the ends of the pivot pin 66, as best shown in Fig. 3 of the drawings.

The outer shank member 22 is provided at its forward end with a downwardly and forwardly sloping portion 70 carrying the carpet gripping head 12. The trigger 60 is provided at its forward end with a complementary, downwardly and forwardly sloping, thumb-operated actuator 72. As best shown in FIG. 2 of the drawings, by pressing upwardly and forwardly on the actuator 72 to displace it into the position illustrated in broken lines, the entire trigger 60 is pivoted about the axis of the pivot pin 66 to retract the movable stop 42 downwardly into its inoperative position. Under such conditions, the movable stop 42 is withdrawn from between the fixed stop 44 on the outer shank member 22 and an adjacent one of the fixed stops 46 on the inner shank member 24.

The trigger 60 is biased into its solid-line position in FIG. 2 by a compression coil spring 74, thereby biasing the movable stop 42 into its operative position, wherein it acts in shear between the fixed stop 44 on the outer shank member 22 and one of the fixed stops 46 on the inner shank member 24. The spring 74 is disposed in a downwardly facing spring cavity 76 formed in the downwardly and forwardly sloping portion 70 of the outer shank member 22, the upper end of the spring 74 being seated against the upper end of the spring cavity. The lower end of the spring 74 is seated on a strap 80 having a rearward end 82 overlying and welded to the trigger 60 on opposite sides of the pivot pin 66. The rearward end 82 of the strip 80 provides a journal 84 for the pivot pin 66 which overlies the pivot pin. The forward end 86 of the strap 80 extends downwardly to and is welded or otherwise fastened to the forward end of the trigger actuator 72.

It will be apparent that, with the foregoing construction, the coil spring 74 is compressed when the trigger actuator 72 is displaced upward and forwardly to withdraw the movable stop 42 downwardly, this condition being shown in broken lines in FIG. 2 of the drawings. When the trigger actuator 72 is released, the coil spring 74 returns the trigger 60 to the solid-line position of FIG. 2, assuming that the relative longitudinal positions of the shank members 22 and 24 are such as to permit insertion of the movable stop 42 between the fixed stop 44 on the shank 22 and one of the fixed stops 46 on the shank member 24.

It will be noted that when the trigger 60 is in its solid-line position in FIG. 2, it is flush with the lower surface of the outer shank member 22. Consequently, it does not interfere with the use of the shank 20 as a handle for the carpet stretcher 10, and it provides both a visual and a tactile indication that the movable stop 42 is in its operative position to lock the shank members 22 and 24 in one of their relative longitudinal positions.

The invention also provides interengageable means 90 on the shank members 22 and 24 for maintaining the movable stop 42 in positive engagement with the fixed stop 44 on the shank member 22 and the adjacent fixed stop 46 on the shank member 24. With this construction, there is no rattling of parts during handling or use of the carpet stretcher 10, which is an important feature. Another important feature is that the interengageable means 90 constitute detent means for releasably latching the shank members 22 and 24 in their different relative longitudinal positions for indexing purposes, thereby facilitating lateral insertion of the movable stop 42 between the single fixed stop 44 and each of the series of longitudinally spaced, fixed stops 46.

More particularly, the interengageable detent means 90 on the shank members 22 and 24 comprise two longitudinally spaced ball detents 92 carried in upwardly facing cavities 94 in the inner shank member 24 and biased upwardly into engagement with the lower side of the top wall of the shank member 22 by compression coil springs 96 in such cavities. The lower surface of the top wall of the outer shank member 22 is provided with longitudinally spaced detent recesses 98 two of which receive the ball detents 92 to index the inner shank member 24 relative to the outer shank member 22.

As best shown in FIG. 2 of the drawings, the ball detents 92 are rearwardly offset slightly relative to the detent recesses 98 when the movable stop 42 is inserted between the single fixed stop 44 and each of the longitudinal series of fixed stops 46. Consequently, as shown in FIG. 2, the ball detents 92 engage the rearward sides 100 of the detent recesses 98. The result is that the detent springs 96, acting through the ball detents 92 and the rearward sides 100 of the detent recesses 98, act to bias the inner shank member 24 forwardly relative to the outer shank member 22. The effect of this is to positively clamp the movable stop 42 between the single fixed stop 44 and the adjacent one of the longitudinal series of fixed stops 46. With this construction, no rattling of parts is possible in handling or use of the carpet stretcher 10.

To enhance the foregoing antirattling action, the rearward sides 100 of the detent recesses 98 are somewhat steeper than the forward sides thereof. In other words, the rearward sides 100 of the detent recesses 98 make a larger angle with the horizontal than do the forward sides thereof.

Another feature of the invention resides in the attachment of the bumper 18 to the inner shank member 24, which is best shown in FIGS. 6 and 7 of the drawings. Referring thereto, the inner shank member 24 is provided with a rearwardly-tapered rearward end 110 having the general configuration of a truncated wedge. The bumper 18 includes a housing 112 having a complementarily tapered socket 114 which receives the tapered end 110 of the shank member 24. Formed in the tapered end 110 of the shank member 24 is a cavity 116 which is open on one side of the tapered end 110 and which loosely, but nonrotatably, receives a nut 118. Threaded into the nut 118 is the forward end of a longitudinally-extending bolt 120 having at its rearward end a head 122 and lock washer 124 seated against a transverse wall portion 126 of the bumper housing 112.

The bumper 18 includes a pad 128 suitably secured to the rear side of the bumper housing 112, as by means of screws, not shown, accessible through openings 130 in the front surface of the bumper housing 112. Prior to installation of the pad 128, the bolt head 122 is accessible for the purpose of threading the forward end thereof into the loosely-caged nut 118. As will be apparent, in order to assemble the bumper 18 and the inner shank member 24, the nut 118 is first inserted laterally into the cavity 116. Then, the tapered end 110 of the inner shank member 24 is inserted into the socket 114 and the bolt 120 is inserted through the transverse wall portion 126 of the bumper housing 112. The forward end of the bolt 120 is then threaded into the nut 118 and the bolt is subsequently tightened to positively secure the bumper housing 112 to the inner shank member 24. Thereafter, the pad 128 is installed.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim as our invention:

1. In a knee-actuable carpet stretcher, the combination of:
 (a) a carpet gripping head engageable with a carpet to be stretched;
 (b) a knee-actuable bumper for advancing said head to stretch a carpet gripped thereby;
 (c) an adjustable-length shank for transmitting carpet stretching forces from said bumper to said head and including two shank members longitudinally slidable relative to each other and respectively connected to said head and said bumper;
 (d) longitudinally spaced, laterally extending, fixed stops on one of said shank members;
 (e) a longitudinally extending trigger pivotally mounted on the other of said shank members and carrying a laterally movable stop having a laterally extending surface respectively engageable with said fixed stops on said one shank member in different relative longitudinal positions of said shank members; and
 (f) another laterally extending, fixed stop on said other shank member and engageable with an opposite laterally extending surface of said movable stop so that said movable stop acts in shear to transmit carpet stretching forces from said bumper to said head.

2. A knee-actuable carpet stretcher as defined in claim 1 including interengageable means for longitudinally biasing said movable stop on said other shank member into engagement with each of said fixed stops on said one shank member.

3. A knee-actuable carpet stretcher as defined in claim 1 including interengageable means for longitudinally biasing said movable stop on said other shank member into engagement with each of said fixed stops on said one shank member and for releasably latching said shank members in their different relative longitudinal positions.

4. A knee-actuable carpet stretcher as defined in claim 1 wherein said other shank member is provided in an external surface thereof with a longitudinally extending recess containing said trigger.

5. In a knee-actuable carpet stretcher, the combination of:
 (a) a carpet gripping head engageable with a carpet to be stretched;
 (b) a knee-actuable bumper for advancing said head to stretch a carpet gripped thereby;
 (c) an adjustable-length shank for transmitting carpet stretching forces from said bumper to said head and including two shank members longitudinally slidable relative to each other and respectively connected to said head and said bumper;
 (d) longitudinally spaced, laterally extending, fixed stops on one of said shank members;
 (e) a laterally extending, movable stop carried by the other of said shank members and respectively engageable with said fixed stops on said one shank member in different relative longitudinal positions of said shank members; and
 (f) interengageable means for longitudinally biasing said movable stop on said other shank member into engagement with each of said fixed stops on said one shank member, said interengageable means being carried by said shank members and acting to bias said shank members longitudinally relative to each other in directions to maintain said movable stop on said other shank member in engagement with each of said fixed stops on said one shank member.

6. A knee-actuable carpet stretcher as set forth in claim 5 wherein said interengageable means include means for releasably latching said shank members in their different relative longitudinal positions.

7. A knee-actuable carpet stretcher as set forth in claim 6 wherein said interengageable means include spring-biased detents carried by one of said shank members and insertable into detent recesses in the other.

8. A knee-actuable carpet stretcher as defined in claim 7 wherein said detent recesses are provided with walls inclined relative to the axis of said shank members and engageable by said detents to longitudinally bias said movable stop into engagement with each of said fixed stops.

References Cited

UNITED STATES PATENTS

| 2,319,992 | 5/1943 | Hubbard | 294—19 |
| 2,876,583 | 3/1959 | Young | 294—8.6 |
| 2,882,642 | 4/1959 | Hill | 294—8.6 |

FOREIGN PATENTS

| 948,761 | 2/1949 | France. |
| 353,394 | 5/1922 | Germany. |

GERALD M. FORLENZA, *Primary Examiner.*

G. F. ABRAHAM, *Assistant Examiner.*